No. 837,231. PATENTED NOV. 27, 1906.
J. BIJUR.
SYSTEM OF ELECTRIC REGULATION.
APPLICATION FILED FEB. 17, 1905.
3 SHEETS—SHEET 2.
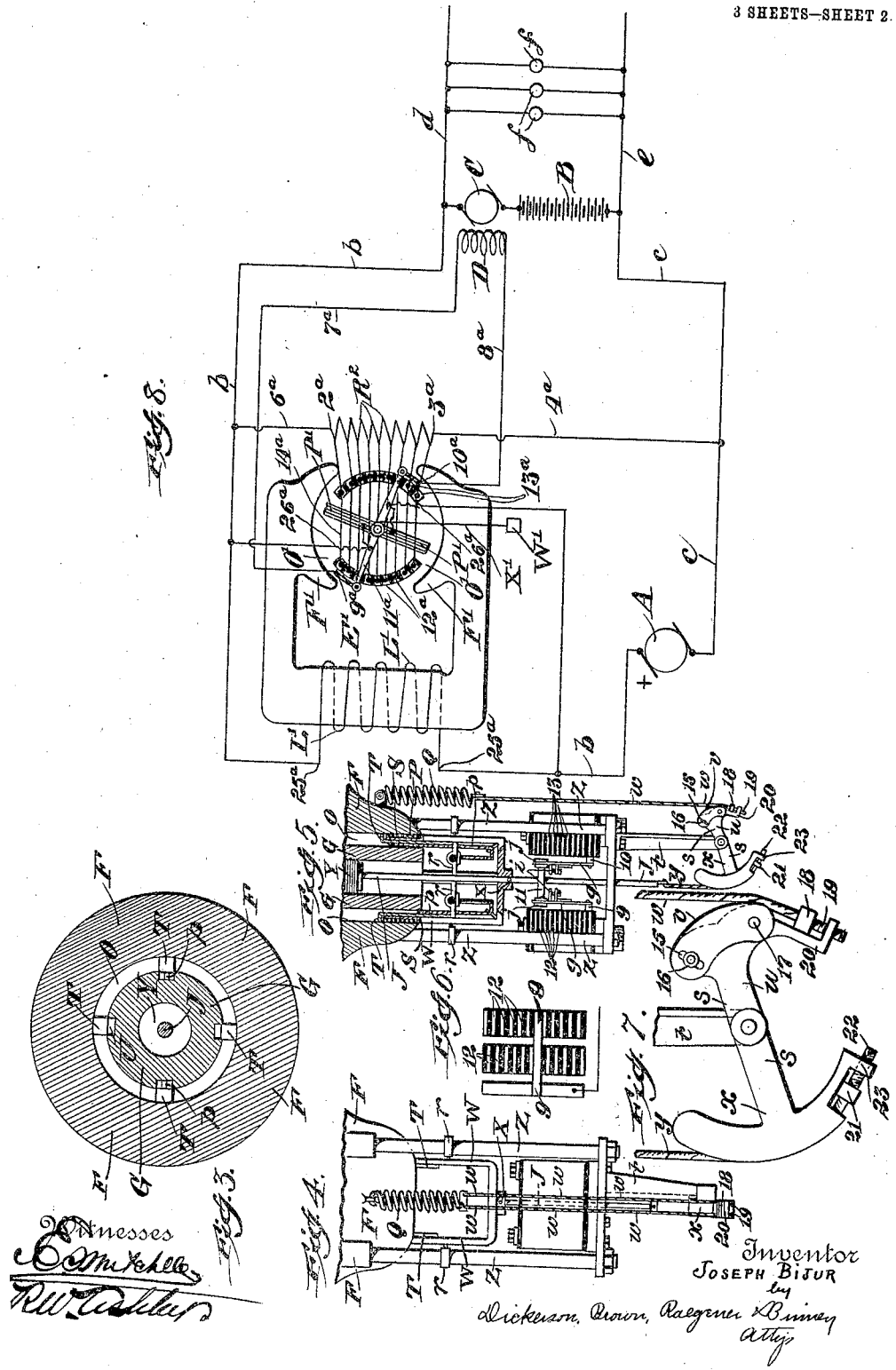
Witnesses
Inventor
JOSEPH BIJUR
by Dickerson, Brown, Raegener & Binney
Attys

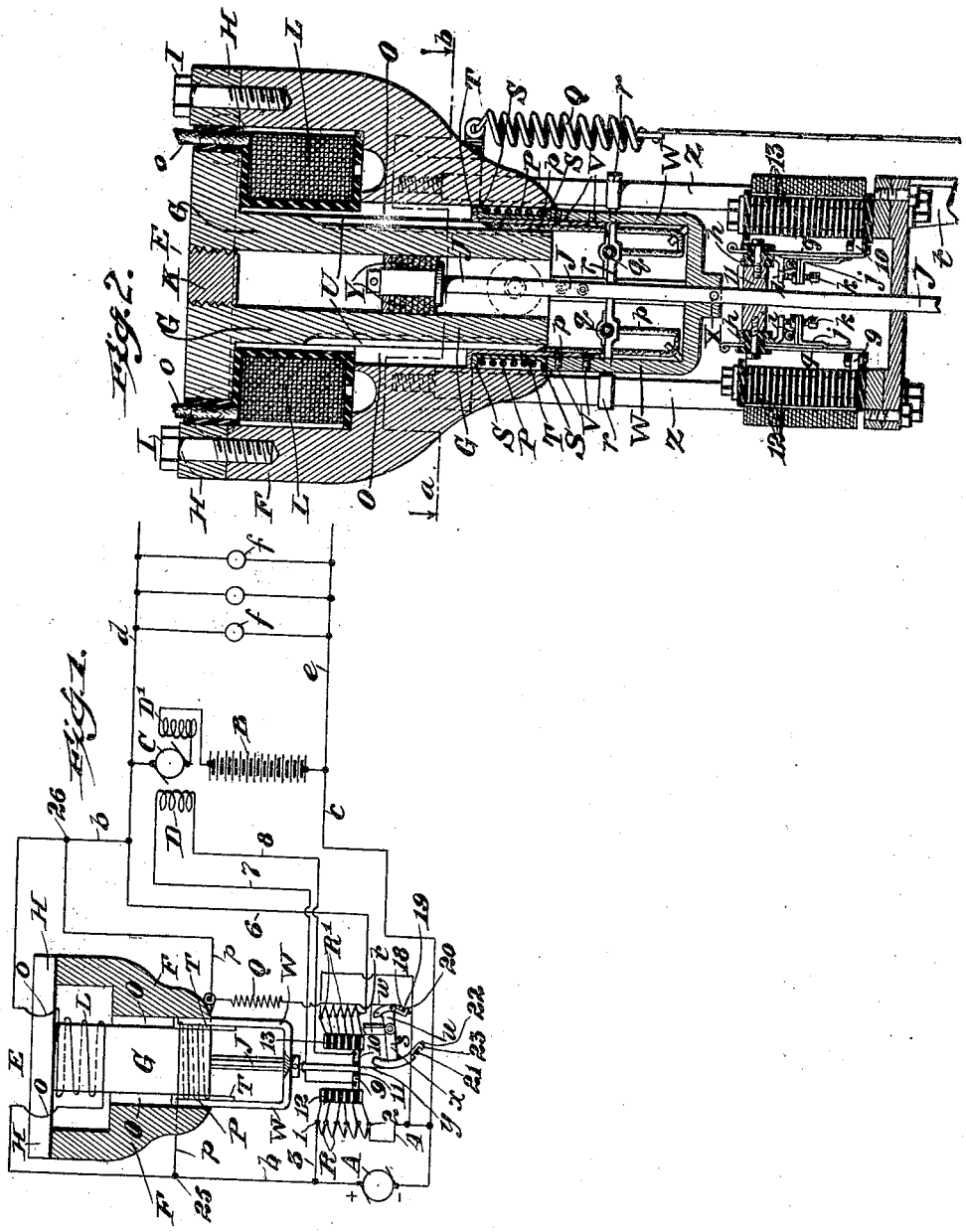

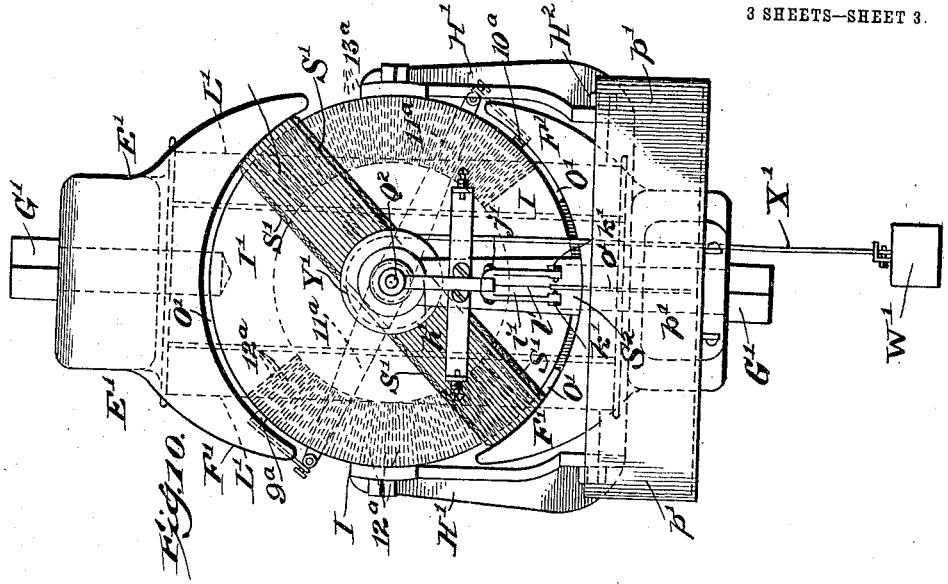
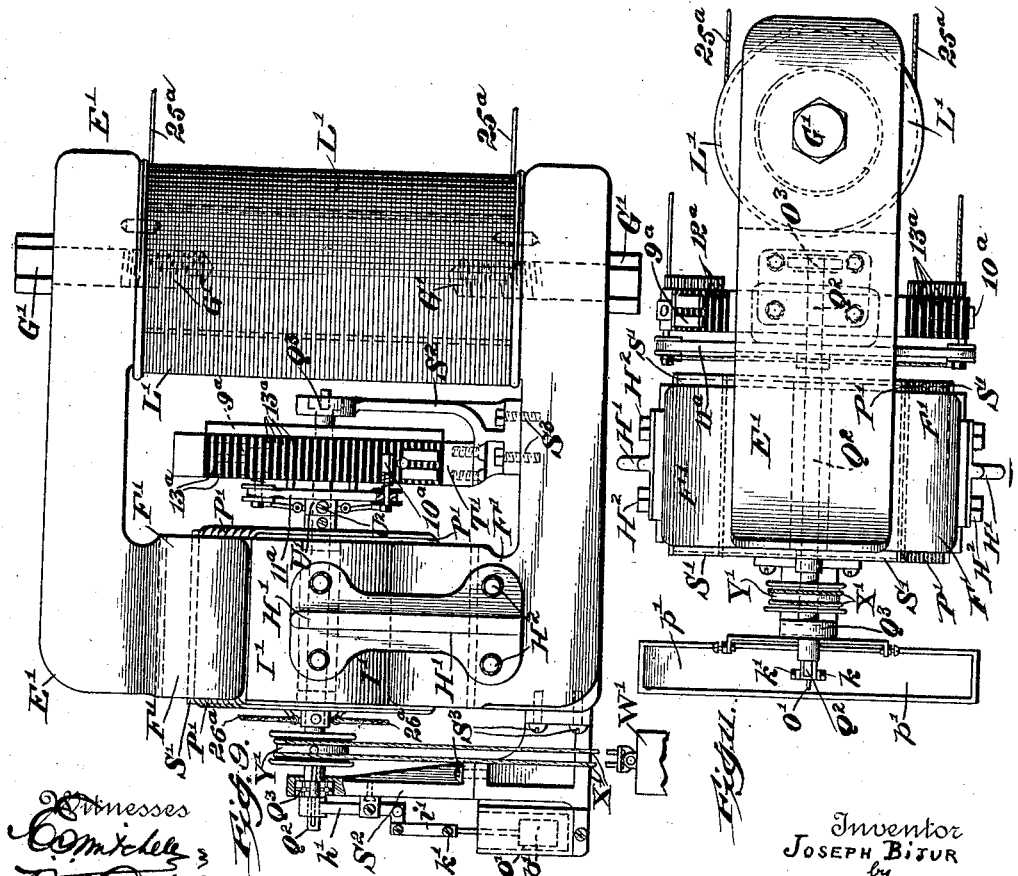

UNITED STATES PATENT OFFICE.

JOSEPH BIJUR, OF NEW YORK, N. Y., ASSIGNOR TO THE GENERAL STORAGE BATTERY COMPANY, OF NEW YORK, N. Y., A CORPORATION OF NEW YORK.

SYSTEM OF ELECTRIC REGULATION.

No. 837,231.     Specification of Letters Patent.     Patented Nov. 27, 1906.

Original applications filed September 24, 1904, Serial Nos. 225,745 and 225,746. Divided and this application filed February 17, 1905. Serial No. 246,077.

*To all whom it may concern:*

Be it known that I, JOSEPH BIJUR, a citizen of the United States, and a resident of the borough of Manhattan, city, county, and State of New York, have invented certain new and useful Improvements in Systems of Electric Regulation, of which the following is a specification, accompanied by drawings.

This application in so far as it relates to Figures 1 to 7, inclusive, is a division of my copending application, Serial No. 225,745, filed September 24, 1904, and in so far as it relates to Figs. 8 to 11, inclusive, this application is a division of my copending application, Serial No. 225,746, filed September 24, 1904, both of which applications relate to regulators, while this application relates to a system of regulation.

This invention relates to systems of electric distribution in which storage batteries or other suitable sources of auxiliary supply are used in addition to the generating-dynamo, and an auxiliary dynamo is provided to cause the battery to charge or discharge as the external load decreases or increases. The voltage of the auxiliary dynamo is made to vary in direction and amount, or both, as the voltage requirements of the system may necessitate.

The objects of the invention are to maintain a substantially constant load on the generating-dynamo with a fluctuating external load and to improve upon the means for varying the voltage of the auxiliary dynamo with the external load.

To these ends the invention consists of the system of regulation, apparatus, and devices for carrying out the above objects, consisting of the combinations of elements, features of construction, and arrangement of parts having the general mode of operation substantially as hereinafter fully described and claimed in this specification and shown in the accompanying drawings, in which—

Figure 1 is a diagrammatic view of circuits and connections for the electromagnetic controller used in connection with the system, the controller also being shown diagrammatically and partly in section. Fig. 2 is a vertical sectional side view of the controller, a portion of the lower part having been broken away. Fig. 3 is a transverse sectional view of the controller, taken on the line *a b* of Fig. 5. Fig. 4 is a detail vertical end view of the lower portion of the controller, which portion carries the resistances. Fig. 5 is a detail vertical side view, partly in section, of the lower portion of the controller corresponding to Fig. 7. Fig. 6 is a detail face view of the contacts or segments for one of the resistances to which the sections of said resistance are connected. Fig. 7 is an enlarged detail view of the adjusting device for adjusting the tension of the controller-spring. Fig. 8 is a diagrammatic view of a modification with some of the iron parts of the controller removed. Fig. 9 is a side elevation of the regulator. Fig. 10 is an end elevation of the same. Fig. 11 is a plan view.

Referring to the drawings, and at first more particularly to Fig. 1, A represents a suitable dynamo or source of supply connected to the mains *b* and *c*, while the work portion of the system carrying the external load is represented by the conductors *d* and *e*. In this instance the load is represented by the lamps *f* by way of illustration. Connected across the mains is shown a storage battery B, in series with which is arranged the armature of the auxiliary dynamo C, the field D of which is connected to be varied both in direction and amount by the electromagnetic controller (represented by E,) which controls the resistances R R', connected in circuit with the field-winding D of dynamo C. The controller E is so connected as to be indirectly responsive to changes in the external load of lamps *f* or other electroreceptive devices.

The resistances R R' may be connected to any suitable source of exciting-current; but in this instance they are shown connected across the mains *b c* of the generator A. They are, however, connected reversely, the upper and lower terminals 1 and 2 of the resistance R in Fig. 1 being connected, respectively, to the positive and negative sides of the generator A by wires 3 and 4, while the upper and lower terminals 1 and 2 of resistance R' are reversely connected by wires 5 and 6 to the negative and positive sides of the generator A. The terminals of the field-winding D of dynamo C are connected by wires 7 and 8 to the brushes 9 and 10, which are insulated from each other and from the common support 11 and are adapted to be moved along the insulated contacts or segments 12 and 13, to which the sections of resistances R and R' are suitably connected. Any suitable and convenient arrangement of resistances, contacts, and brushes may be provided for attaining the ends in view, and I do not limit myself to the construction shown.

When the brushes are in the lower position, as shown, the brush 10 will be at the same potential as the positive side of the source of supply A, while brush 9 will have the potential of the negative side and there will be between these two brushes the full voltage of the source of exciting-current for the field D, the current passing from the positive brush of dynamo A, through the main b by wire 6, through terminal 2 of resistance R' to brush 10, from thence by wire 8 to and through the field D, returning by wire 7 to brush 9, to terminal 2 of resistance R, and by wire 4 back to the negative main c and the negative brush of dynamo A.

When the brushes are in the uppermost position, brush 9 will be of positive polarity and brush 10 negative, in which case the full voltage will be impressed upon the brushes 9 and 10, but in a reverse direction, the current then passing from the positive brush of the dynamo by wire 3 to brush 9, thence by wire 7 through field D, and back by wire 8 to brush 10, and from thence by wire 5 to the negative side of dynamo A.

When the brushes 9 and 10 are on the middle portions of the series of contacts 12 and 13, there will be no potential between them, because the voltage drop through resistance R is equal to that through resistance R', and there will be no difference of potential between the middle portions of the series of contacts 12 and 13. It is obvious that in intermediate positions between the middle portions and the upper and lower contacts 12 and 13 there will be various values of electromotive force between the brushes in one direction or the other, by means of which construction and operation the excitation of the field D, and consequently the voltage of the armature of the auxiliary dynamo C, will vary in direction and amount with the position of the brushes 9 and 10.

The controller E is constructed to provide a substantially uniform working field of force in which an electrical conductor is mounted having a substantially large range of movement in said field. Means are provided for opposing a substantially uniform mechanical pull to the movement of the conductor in the working field of force, whereby when the balance between the electrical and mechanical forces is disturbed the conductor moves until the balance is restored. The moving conductor referred to is connected to control the movement of the brushes 9 and 10 to vary the field D of the auxiliary dynamo or "booster-crusher" C.

The controller E may be constructed in a variety of ways, and one suitable construction which has been found to operate efficiently and well is illustrated in the drawings, although equivalent constructions may be found to operate upon the same principle as the controller herein disclosed. In the construction in this instance the hollow frame F is preferably of cast-steel, while the field-core G, preferably of cast-steel or wrought-iron, is adapted to be suitably secured within the frame F and for this purpose is provided with the cap H, which may be secured to the frame F by means of the bolts I. As will be seen in the cross-sectional view in Fig. 3, the frame F and core G are substantially cylindrical, and the core G is hollow to allow the operating-shaft J to have movement therein. The upper end of the hollow core G may be closed by a suitable plug K. Around the core G is arranged the field-winding L, adapted to be energized and thereby produce a magnetic circuit through the core G and across the air-gap O between said core and the surrounding frame F. In the air-gap O is a substantially uniform useful or working field of force produced by the excitation of the coil L. Surrounding the core G is a movable coil P, adapted to move along the axis of the core, the movement of which is opposed in one direction by the spring Q. When the electrical force tending to move the coil P and the pull of the spring are in equilibrium, said coil P remains stationary.

In the construction of the apparatus the coil P is preferably wound upon a brass spool S, in turn carried by the brackets or arms T, preferably of aluminium, which are adapted to move in the grooves U in the outer face of the core G, whereby the air-gap is reduced, the movement is guided, and the coil P is prevented from twisting, although any other suitable means may be provided for accomplishing these objects. Suitably secured to the arms or brackets T by means of the screws V is provided the spider W, preferably of aluminium, which is in turn connected to the operating-rod J, as by means of the pin X, so that the movement of the coil P is imparted to the operating-rod J. The brushes 9 and 10 are suitably connected to the rod J and movable therewith. The hollow portion of the core G forms a dash-pot in connection with the piston Y, connected to the upper end of the rod J. The brushes 9 are suitably secured to the supporting-piece 11, carried by the rod J and fixedly secured thereto. While different constructions may be provided for the brushes, a suitable construction is shown in the drawings, from which it will be seen that the brushes are fastened to metallic springs g, suitably secured to the supporting-piece 11, but insulated therefrom by means of the insulating sleeves and washers h. Means are provided for regulating the force with which the brushes are pressed against the series of contacts or segments 12 and 13, as shown in this instance brackets i being secured to the support 11, but insulated therefrom, while bearing-blocks j are pivoted to said brackets and provided with adjusting-screws k, adapted to bear upon the under portions of the brackets i, whereby adjustment of the screws k causes the bearing-blocks j to push the springs g more or less strongly against the segments 12 and 13.

Supported from the frame F by means of rods Z, which may be of brass, are the segments comprising the contacts 12 and 13. The resistances R and R', which may be of any suitable character, are suitably connected in sections to the insulated segments 12 and 13 and are placed in any convenient location where suitable connections may be made.

In order to connect the field-coil L in circuit, the leads o are provided, as shown, passing through several apertures in the cap H, but insulated from said cap. The movable coil P is connected in circuit by means of the flexible leads p, which, as shown, lead from said coil to binding-posts q on the bracket r, secured to the rods Z.

To oppose the action of the magnetic force tending to move the coil P in one direction, a suitable spring Q is provided with devices so arranged that there is a substantially uniform mechanical pull exerted by the spring opposing the movement of the conductor. Different arrangements may be provided for this purpose; but as shown in the drawings a rocker s is pivotally supported by a bracket t, secured to the lower portion of the framework of the apparatus. The shorter arm u of the rocker has an eccentrically-shaped rim portion v, and the lower portion of said arm u is secured by a cord w to the spring Q. The longer arm x of the rocker s is secured by means of a cord y to the lower end of the operating shaft or rod J. As the movable coil P is moved upward under the influence of the magnetic field the spring Q exerts a pull tending to oppose the movement of the coil, and by reason of the eccentric form of the rocker s the moment of the force about the axis of the rocker tending to oppose the spring is substantially constant.

The eccentricity of the portion v of the rocker may be varied, because as shown in this instance the portion v is adjustable by means of the slot 15 and the pin 16, which permits the portion v to be moved in and out on the pivot 17 and secured in any desired position. The cord w, as shown, is attached to a block 18, carried by the screw 19, secured in the bracket 20, which projects from the portion u of the rocker, whereby the tension of the spring may be slightly varied. At the other side of the rocker the cord y is secured to a block 21, carried by the screw 22, secured in the bracket 23, whereby the cord y may be tightened and loosened.

In order that a greater number of segments or contacts 12 and 13 may be arranged in a small space, these contacts are arranged in parallel staggered rows, as shown in Fig. 6, over which the brushes 9 or 10 are adapted to pass. The sections of the resistances R and R' may be suitably connected to the segments as arranged in Fig. 6.

In connecting the electromagnetic controller E in circuit in the system shown in Fig. 1 the coils L and P are arranged in parallel with each other and the combination of the two coils is connected in series with the generator A. As shown in Fig. 1, the leads o of the coil L are connected in circuit with the main b, while the leads p of the coil P are connected to points 25 and 26 on the main b, so that coil P is in parallel to coil L. By the arrangement described any increase of load on the generator A will result in an increase of current through both coils L and P. The pull on the coil P is of course proportional to the strength of the current flowing through it and the density of the magnetic field through which it travels. It is therefore obvious that any change in the current through the coil L or through coil P, or through both, will cause a corresponding change in the electromagnetic force acting on coil P, resulting in movement of said coil until the force of the spring and the force acting on the coil P to move it are in equilibrium. Any change, therefore, in the load on the generator A will result in a change in the magnetic conditions in the regulator E, which will give a corresponding change in the voltage of the auxiliary dynamo C.

The operation of the regulator is as follows: The regulator is set for a given normal load, and the external load being equal thereto the magnetic force due to the current flowing through the regulator E is just sufficient to make the coil P take a position half-way down the length of the air-gap O, so that said coil is in its middle position. The brushes 9 and 10 will also be in their middle position relatively to the segments 12 and 13, so that the excitation of the field D of the auxiliary dynamo C is zero, and its voltage is also zero. There is therefore no tendency on the part of the dynamo C to assist the storage battery B either to charge or discharge. When the load on the external circuit exceeds the normal, the pull on the coil P will increase, due to a slight increase in the current from the generator A. This increase in the pull upon the coil P will cause it to move upward, and the brushes 9 and 10 will bear upon one of the upper pairs of contacts 12 and 13, thereby giving an excitation to the field D of dynamo C and causing the dynamo to generate an electromotive force which adds itself to that of the battery, causing the battery to discharge and assist the generator. Conversely, when the external load falls below the normal the diminished pull upon the coil P enables the spring Q to pull said coil P below its middle position, and with it the brushes 9 and 10, thereby impressing an electromotive force on the field D of dynamo C in the opposite direction and producing in the auxiliary dynamo C an electromotive force in the opposite direction, which assists the generator-voltage to send current into the battery. The instant the external load begins to change the coil P will begin its movement in the proper direction and continue moving until the generator-current is restored to its normal value. In other words, the brushes 9 and 10 will be caused to move to such a point on the contacts 12 and 13 that the excitation of field D of auxiliary dynamo C produces a voltage in said dynamo just sufficient to cause the battery to charge or discharge an amount equal to the difference between the external load and the normal generator-load. By correctly proportioning the parts of the regulator it is possible to keep the generator-load constant within a few per cent. of the normal. The changes which have been mentioned as taking place in the generator-current are more strictly tendencies to change which are checked in their inception.

Referring to Fig. 8, A represents a suitable dynamo or source of supply connected to the mains $b$ $c$, while the work portion of the system carrying the external load is represented by the conductors $d$ and $e$. In this instance the load is represented by the lamps $f$ by way of illustration. Connected across the mains is shown a storage battery B, in series with which is arranged the armature of the auxiliary dynamo C, the field D of which is connected to be varied both in direction and amount by the electromagnetic controller, (represented by E',) which controls the resistance $R^2$, connected in circuit with the field-winding D of dynamo C. The controller E' is so connected as to be responsive to changes in the external load of lamps $f$ or other electroreceptive devices. The resistance $R^2$ may be connected to any suitable source of exciting-current; but in this instance it is shown connected across the mains $b$ $c$ of the generator A. As shown, the sections of the resistance $R^2$ are connected to the segments $13^a$ of a circular commutator, while segments $13^a$ are connected by wires $14^a$ to the segments or contacts $12^a$. In this instance the series of segments $12^a$ and $13^a$ are shown in the form of the arcs of a circle, and by cross-connecting the segments $12^a$ and $13^a$ to each other it is only necessary to use one resistance $R^2$ instead of separate resistances connected to each series of contacts $12^a$ and $13^a$. The terminals of the field-winding D of dynamo C are connected by wires $7^a$ and $8^a$ to the brushes $9^a$ and $10^a$, carried by a movable arm $11^a$, but suitably insulated therefrom. As shown, the brushes $9^a$ and $10^a$ are adapted to be moved along the insulated contacts or segments $12^a$ and $13^a$, to which the sections of resistance $R^2$ are connected. Any suitable and convenient arrangement of resistance, contacts, and brushes may be provided for attaining the ends in view, and I do not limit myself to the construction shown. The brushes are so arranged relatively to the series of contacts or segments $12^a$ and $13^a$ that when brush $9^a$ is in its uppermost position, as shown in Fig. 1, brush $10^a$ is in its lowermost position, and the current flowing through the circuit of the field D of dynamo C will have a definite direction. When the position of the brushes $9^a$ and $10^a$ is reversed—that is to say, when brush $10^a$ is uppermost and brush $9^a$ is lowermost—the direction of the current in the field-circuit of winding D will be reversed.

When the brushes are in the position shown in Fig. 1, brush $9^a$ will be at the same potential of the positive side of the source of supply A, while brush $10^a$ will have the potential of the negative side, and there will be between these two brushes the full voltage of the source of exciting-current for the field D, the current passing from the positive brush of dynamo A through the main $b$ by wire $6^a$, through terminal $2^a$ of resistance $R^2$, across from one series of segments to the other and to brush $9^a$, from thence by wire $7^a$ to and through the field D, returning by wire $8^a$ to brush $10^a$ to terminal $3^a$ of resistance $R^2$, and by wire $4^a$ back to the negative main $c$ and the negative brush of dynamo A.

When the brushes are reversed and brush $10^a$ is uppermost, said brush $10^a$ will be of positive polarity and brush $9^a$ will be negative, in which case the full voltage will be impressed upon the brushes $9^a$ and $10^a$, but in a reversed direction, the current then passing from the positive brush of the dynamo A by wire $6^a$ to brush $10^a$, thence by wire $8^a$ to and through the field D, and back by wire $7^a$ to brush $9^a$, and from thence to terminal $3^a$ of resistance $R^2$, and back by wire $4^a$ to the negative side of dynamo A.

When the brushes $9^a$ and $10^a$ are on the middle portions of the series of contacts $12^a$ and $13^a$, there will be no difference of potential between them, because the voltage drop through one half of resistance $R^2$ is equal to that through the other half. It is obvious that in intermediate positions between the middle portions and the upper and lower contacts $12^a$ and $13^a$ there will be various values of electromotive force between the brushes 9ª and 10ª in one direction or the other, by means of which construction and operation the excitation of the filed D, and consequently the voltage of the armature of the auxiliary dynamo C, will vary in direction and amount with the position of the brushes 9ª and 10ª.

The controller or regulator E', a portion of which relating to resistance, brushes, and segments has already been described, is designed to control the operation of the brushes 9ª and 10ª and automatically move them to the desired positions.

The regulator E' is constructed to provide a substantially uniform working field of force in which an electric conductor is mounted having a substantially large range of movement in said field. Means are provided for opposing a substantially uniform mechanical pull and the movement of the conductor in the field of force, whereby when the balance between the electrical and mechanical forces is disturbed the conductor moves until the balance is restored. The moving conductor referred to is represented diagrammatically by the letter P' in Fig. 11 and is connected to control the movement of the brushes 9ª and 10ª to vary the field D of the auxiliary dynamo or "booster crusher" C.

The controller or regulator E' is constructed on the rotary principle, and reference will be made more particularly to Figs. 9, 10, and 11 to show the mechanical construction of said regulator as utilized in the system of distribution shown in Fig. 8. The frame forming the field-poles F' is preferably of cast-steel, and, as shown, the poles are suitably curved and provided with means for securing them to the core of the field-winding L'. As shown, the field-poles are secured to the core of the field-winding L' by means of suitable bolts G'. Suitably supported between the poles F' by means of brackets H' is a core I', preferably of cast-steel or wrought-iron. The field-winding L' is adapted to be energized, and thereby produce a magnetic circuit through the core I' and across the air-gap O' between said core and the surrounding poles F'. In the air-gap O' is a substantially uniform, useful, or working field of source produced by the excitation of the field-coil L'.

Surrounding the core I' is a movable coil P', preferably wound upon a ribbon-loop S', of copper or aluminium, which loop produces the desired damping effect in the operation of the instrument. As shown, the coil P' and ribbon-loop S' are movable through a predetermined arc in the air-gap O' between the core I' and the poles F'. The coil P' is suitably mounted upon a shaft Q², provided with ball-bearings Q³ and extending axially through the core I', which core, as already stated, is fixed, being secured in position by the brackets H', which are fastened to the frame by means of suitable screws H². Any suitable mounting may be provided whereby the coil P' and ribbon-loop S' are carried by the shaft Q² and rotatable therewith. Suitable standards S² are provided for the shaft, as shown, said standards being secured to the frame by means of suitable screws S³. The movement of the coil P' is opposed in one direction by the weight W', connected to the cords X', passing over the pulley Y', fast on the shaft Q². When the electrical force tending to move the coil P' and the pull of the weight W' are in equilibrium, said coil P' remains stationary.

Mounted upon the bracket T' and surrounding the shaft Q² are the series of insulated segments or contacts 12ª and 13ª. These segments 12ª and 13ª are shown in dotted lines in the end view of Fig. 10. The segments are stationary, and the brushes 9ª and 10ª are mounted for movement relatively to said segments. As shown, brushes 9ª and 10ª bear upon the outside of the segments and are carried by an arm 11ª, but insulated therefrom, which arm is in turn mounted upon the sleeve U', fixed to the shaft Q², as by means of the set-screw U², so that the brushes move with the shaft.

In connecting the regulator E' in circuit the terminals 25ª of the field-coil L' are connected in circuit with one of the mains $b\ c$, and the terminals 26ª of the coil P' are likewise connected in circuit, as shown in Fig. 11. The resistance R², which is not shown in Figs. 9, 10, and 11, is also suitably connected, as desired, to the segments of the rotary commutator, and the operation of the apparatus is as described in connection with Fig. 8. Various electrical connections may be provided for the coils L' and P'; but, as shown in this instance, said coils are arranged in parallel with each other, and the combination of the two coils is connected in series with the generator A.

By the arrangement described any increase in load on the generator A will result in an increase of current through both the coils L' and P'. The pull on coil P' is of course proportional to the strength of current flowing through it and the density of the magnetic field through which it travels. It is therefore obvious that any change in the current through the coil L' or through the coil P', or through both, will cause a corresponding change in the electromagnetic force acting on coil P', resulting in the movement of said coil until the pull of the weight W' and the force acting on the coil P' to move it in the other direction are in equilibrium. Any change, therefore, in the load on the generator A will result in a change in the magnetic conditions in the regulator E', which will give a corresponding change in the voltage of the auxiliary dynamo C.

The operation of the regulator is as follows:

The regulator is set for a given normal load, and the external load being equal thereto the magnetic force due to the current flowing through the regulator E' is just sufficient to make the coil P' take a substantially vertical position, referring to Fig. 10, so that said coil P' is between the centers of the pole-piece F', in which case the brushes $9^a$ and $10^a$ will be on the middle portions of the series of segments $12^a$ and $13^a$ and the excitation of the field D of the auxiliary dynamo C is zero, and its voltage is also zero. There is therefore no tendency on the part of dynamo C to assist the storage battery either to charge or discharge. When the load on the external circuit exceeds the normal, the pull on coil P' will increase, due to a slight increase in the current from the generator A. This increase in the pull upon the coil P' will cause it to move counter-clockwise, as Fig. 10 is viewed, so that brush $10^a$ will be above the center of segments $13^a$ and brush $9^a$ will be below the center of segments $12^a$, thereby giving an excitation to the field D of dynamo C and causing the dynamo to generate an electromotive force which adds itself to that of the battery, causing the battery to discharge and assist the generator. Conversely, when the external load falls below the normal the diminished pull upon the coil P' enables the weight W' to move said coil clockwise, as Fig. 10 is viewed, and with it the brushes $9^a$ and $10^a$, thereby impressing an electromotive force on the field D of dynamo C in the opposite direction and producing in the auxiliary dynamo C an electromotive force in the opposite direction, which assists the generator-voltage to send current into the battery. The instant the external load begins to change the coil P' will begin its movement in the proper direction and continue moving until the generator-current is restored to its normal value. In other words, the brushes $9^a$ and $10^a$ will be caused to move to such a position on the contacts $12^a$ and $13^a$ that the excitation of field D of auxiliary dynamo C provides a voltage in said dynamo just sufficient to cause the battery to charge or discharge an amount of current equal to the difference between the external load and the normal generator-load. By correctly proportioning the parts of the regulator it is possible to keep the generator-load constant within a few per cent. of the normal. The changes which have been mentioned as taking place in a generator-current are more strictly tendencies to change which are checked in their inception.

In accordance with this invention a system of regulation provided with my improved regulator compensates for changes in battery-voltage due to temperature, electrolyte density, age, and state of charge, because the movement of the brushes continues until the current conditions are restored, and this range of movement and brush position are independent of the amount of current change.

I am aware that devices have heretofore been patented in which the excitation of an auxiliary generator is varied either in direction or amount; but these changes have always been made through the medium of a rotating motor which is caused to turn in one direction or the other as required, being actuated by a relay. Such an arrangement cannot respond so rapidly or so exactly to the fluctuations in the load demand as the one herein disclosed and made in accordance with this invention, because in accordance with the present invention the moving coil, with its brushes, begins to travel the instant there is any change in the external load. The greater the unbalancing of the system the more rapidly will the regulator respond, and since there is no relay used the time constant is avoided.

In my improved regulator the balance between the mechanical pull exerted by the weight and the electrical force in the regulator is independent of the position of the moving part. The inertia may be made very small and the motion of the coil tends to damp it, assisting the action of the mechanical damper before mentioned. The instrument is direct acting, and the inertia of the moving parts is independent of the strength of the magnetic field, which is not the case in an ordinary solenoid. The force that tends to make the change in the instrument is in a certain proportion to the disturbance of condition, and when the balance is disturbed the coil moves until the balance is restored. Together with the advantages set forth, the instrument combines a large and uniform force, sensitiveness, and a large range of movement. With an ordinary solenoid the movement of the core changes or distorts the field, and consequently a constant pull is not produced. On the contrary, in accordance with my invention the field is not changed or distorted, and I obtain a substantially constant pull at all times.

A mechanical damper may be provided to assist the damping effect of the ribbon-loop S' and damp a large movement of the coil P'. As shown, the outer end of shaft $Q^2$ is provided with a downwardly-extending arm $h'$, to which the side pieces $i'$ are secured by screw $j'$. These side pieces carry set-screws $k'$, and between them is arranged the flexible spring $l'$, secured to the arm $h'$ and carrying the paddle $o'$, movable in the trough $p'$, filled with glycerin, preferably. It will be seen that upon a small movement of coil P' the paddle will not be moved, because the spring $l'$ will bend; but upon a large movement of coil P' the top of the paddle will bear upon one of the set-screws $k'$ and the blade of the paddle will move through the glycerin.

Instead of providing a substantially constant field of force in the regulator a variable field may be provided, and the movement of the conductor may be opposed by a spring of variable tension, so that the strength of the field of force increases with the tension of the spring, whereby for a given change in electrical conditions the moving coil will travel until the current conditions are restored to normal. The pull of the magnetic field will be equal to the tension of the spring in all positions of the moving coil throughout the whole range of travel, because as the strength of the field increases the pull of the spring increases. The tendency to move with a given electrical condition will be the same at all parts of the magnetic field.

The essential features of the apparatus of the character described comprise a useful field of force, an electric conductor mounted for movement in said field and having a substantially large range of movement, and mechanical force opposing the movement of said conductor, the pull of the mechanical force being equal to the opposing mechanical force in all positions of the moving conductor throughout the whole range of travel, whereby with a given electrical condition in the instrument the tendency of the conductor to move is the same in all parts of the magnetic field.

I claim, and desire to obtain by Letters Patent, the following:

1. The combination with a work-circuit, a dynamo-electric source of supply connected thereto, a battery connected to the work-circuit, a booster included between the source of supply and the battery and a regulating device for controlling the electromotive force of the booster connected in circuit between the source of supply and the battery, said regulating device comprising means tending to adjust it in one direction by the current passing through it from the source of supply, and means opposed thereto and tending to adjust it in an opposite direction, the said two adjusting means being substantially balanced at all positions throughout the range of adjustment at a given normal current from the said source of supply, whereby a slight variation from said normal current will cause the adjustment of the regulating device and thereby vary the electromotive force of the booster until the normal current is substantially restored.

2. The combination with a work-circuit, a supply-circuit, a storage battery, a booster-dynamo controlling the charge and discharge of the battery and an electroresponsive device connected in circuit and controlling suitable means for effecting variation of the electromotive force of the booster-dynamo, said electroresponsive device having a definite range of travel, and motion taking place in said device when the electrical condition of the circuit energizing said device changes, which motion continues until the electrical condition of the energizing-circuit is restored to normal value.

3. The combination with a source of supply, supply and work circuits connected thereto, a storage battery, a booster-dynamo controlling the charge and discharge of the battery and an electroresponsive device connected in circuit in such manner as to be traversed by a substantially constant current and controlling suitable means for effecting and controlling variation of the electromotive force of the booster-dynamo, whereby motion takes place in said electroresponsive device when the electrical condition of the circuit energizing the same changes, which motion continues until the electrical condition of the energizing-circuit is restored to normal value.

4. The combination with a source of supply and supply-mains, a storage battery and a booster-dynamo controlling the charge and discharge of the battery, of an electromagnetic controller operatively connected in circuit and controlling suitable means for effecting variation of the field of the booster-dynamo in accordance with changes in the external load of the system, said controller having a definite range of travel and a substantially uniform working field of force produced by a substantially constant current, an electric conductor carrying a current and mounted for a substantially large range of movement in said field, and means for producing a substantially uniform mechanical pull opposing the movement of said conductor whereby when the balance between the electrical and mechanical forces is disturbed by changes in the external load of the system, the conductor moves until the balance is restored by the restoration of the electrical condition of the supply-mains to normal value.

5. The combination with a source of supply and supply-mains, a storage battery and a booster-dynamo controlling the charge and discharge of the battery, of an electromagnetic controller operatively connected in circuit and controlling suitable means for effecting variation of the field of the booster-dynamo in accordance with changes in the external load of the system, said electrical controller having a definite range of travel and having poles arranged to produce a field of force substantially uniform throughout its working range, produced by a substantially constant current, a conductor carrying a current and mounted for movement in and by the said field of force, means for opposing a force equal to the pull of said conductor at each position in its range of movement for a given electromagnetic energization of the parts whereby a substantial variation in the electromagnetic energization of one of said parts from a fixed amount due to changes in the external load of the system will tend to cause a movement throughout the entire range while the said variation continues and until the restoration of the electrical condition of the supply-mains to normal value.

6. The combination of a source of supply and supply-mains, a storage battery and booster-dynamo controlling the charge and discharge of the battery, an electromagnetic controller connected in circuit and controlling suitable means for effecting variation of the field of the booster-dynamo in accordance with changes in the external load of the system, said controller having a definite range of travel and a substantially constant magnetic field produced by a substantially constant current, a current-energized member movable with respect to said field and tending to move when both the field and moving member are energized, and means for producing an elastic force opposing said motion and so related to the electromagnetic forces as to make the difference between the two said forces constant with a given degree of energization at any position in the range of travel of the movable member, whereby when the balance between the electric and elastic forces is disturbed by changes in the external load of the system the movable member moves until the balance is restored by the restoration of the electrical condition of the supply-mains to normal value.

7. The combination of a source of supply and supply-mains, a storage battery and booster-dynamo controlling the charge and discharge of the battery, an electromagnetic controller connected in circuit and controlling suitable means for effecting variation of the field of the booster-dynamo in accordance with changes in the external load of the system, said controller having a definite range of travel and a substantially constant magnetic field produced by a substantially constant current, a current-energized member movable with respect to said field and tending to move when both the field and moving member are energized, means for producing an elastic force opposing said motion and so related to the electromagnetic forces as to make the difference between the two said forces constant with a given degree of energization at any position in the range of travel of the movable member, the control being effected directly by said movable member, whereby when the balance between the electric and elastic forces is disturbed by changes at the external load of the system the movable member moves until the balance is restored by the restoration of the electrical condition of the supply-mains to normal value.

8. The combination of a source of supply and supply-mains, a storage battery and booster-dynamo controlling the charge and discharge of the battery, an electromagnetic controller connected in circuit and controlling suitable means for effecting variation of the field of the booster-dynamo in accordance with changes in the external load of the system, said controller having a definite range of travel and a substantially constant magnetic field produced by a substantially constant current, a current-energized member movable with respect to said field and tending to move when both the field and moving member are energized, means for producing an elastic force opposing said motion and so related to the electromagnetic forces as to make the difference between the two said forces constant with a given degree of energization at any position in the range of travel of the movable member, the tendency to move and speed of motion being proportional to the change in degree of energization, whereby when the balance between the electric and elastic forces is disturbed by changes in the external load of the system the movable member moves until the balance is restored by the restoration of the electrical condition of the supply-mains to normal value.

9. The combination of a source of supply and supply-mains a storage battery and booster-dynamo controlling the charge and discharge of the battery, an electromagnetic controller connected in circuit and controlling suitable means for effecting variation of the field of the booster-dynamo in accordance with changes in the external load of the system, said controller having a definite range of travel and a substantially constant magnetic field produced by a substantially constant current, a current-energized member movable with respect to said field and tending to move when both the field and moving member are energized, means for producing an elastic force opposing said motion and so related to the electromagnetic forces as to make the difference between the two said forces constant with a given degree of energization at any position in the range of travel of the movable member, the time required to move from one position to some other position being inversely proportional to changes in the electrical condition of the circuit from which the controller is energized, whereby when the balance between the electric and elastic forces is disturbed by changes in the external load of the system the movable member moves until the balance is restored by the restoration of the electrical condition of the supply-mains to normal value.

10. The combination with a work-circuit, and a storage battery having its charge and discharge controlled by a booster-dynamo, of a resistance connected to the field-winding of said dynamo to cause a variation in its electromotive force when the amount of said resistance is varied, and an electroresponsive device controlling said resistance, having a definite range of motion to vary the resistance from zero to a maximum, which device will begin to move if the current through it varies from the normal value for which it is adjusted, and will continue to move until the end of its range of travel is reached unless the current through it be restored to normal before this position is attained.

11. The combination with a work-circuit, and a storage battery, having its charge and discharge controlled by a booster-dynamo, a fixed resistance connected to the booster-field, the electromotive force of said booster being varied by varying the amount of said fixed resistance connected to the booster-field, an electroresponsive device, said variation being effected by variation in position of said electroresponsive device, which has a definite range of travel and in which motion takes place when the electrical condition of the circuit energizing said device changes; said motion continuing until the electrical condition of the energizing-circuit is restored to its normal value.

12. The combination with a work-circuit, a storage battery, and an auxiliary generator, controlling battery charge and discharge, of a fixed resistance in electrical connection with the field-winding of said auxiliary generator, and an electroresponsive device directly acting to vary the amount of said fixed resistance in circuit, and thereby vary the potential of said auxiliary generator, said electroresponsive device having a definite range of motion, the opposition to motion of the resistance-changing mechanism being substantially constant for any position of the device.

13. The combination with a work-circuit, a storage battery, and an auxiliary generator controlling battery charge and discharge, of a field resistance in electrical connection with the field-winding of said auxiliary generator, and an electroresponsive device directly acting to vary the amount of said fixed resistance, and thereby vary the potential of said auxiliary generator, said electroresponsive device, having a definite range of motion, which motion is resisted by the friction of the device and means for exerting an additional opposing force, the sum of these two resisting forces being equal to the pull of the electroresponsive device, for one value only of current through said electroresponsive device independent of the position of the device in its range of travel.

14. The combination with a work-circuit, a storage battery, and an auxiliary generator, controlling battery charge and discharge, of a fixed resistance in electrical connection with the field-winding of said auxiliary generator, and an electroresponsive device directly acting to vary the amount of said fixed resistance, and thereby vary the potential of said auxiliary generator, said electroresponsive device having a definite range of motion which motion is resisted by the friction of the device and an additional opposing force, these two resisting forces and the force set up by current through the electroresponsive device, being in balance at any point in the range of travel, when the said current has a fixed, predetermined value.

15. The combination with a source of supply, a storage battery, and an auxiliary dynamo, of an electromagnetic controller operatively connected to vary the field of the auxiliary dynamo in accordance with changes in the external load of the system, said controller having a substantially uniform working field of force, an electric conductor mounted for a substantially large range of movement in said field, and a substantially uniform mechanical pull opposing the movement of said conductor, whereby when the balance between the electrical and mechanical forces is disturbed, the conductor moves until the balance is restored.

16. The combination with a source of supply, a storage battery, and an auxiliary dynamo, of an electromagnetic controller, operatively connected to vary the field of the auxiliary dynamo in accordance with changes in the external load of the system, said electrical controller having poles arranged to produce a field of force substantially uniform throughout its working range, a conductor mounted for movement in and by the said field of force, means for opposing a force equal to the pull of said conductor at each position in its range of movement for a given electromagnetic energization of the parts, whereby a substantial variation in the electromagnetic energization of one of the said parts from a fixed amount will tend to cause a movement throughout the entire range while the said variation continues.

17. The combination of a source of supply, a work-circuit a storage battery for compensating for changes on the work-circuit and booster for controlling the charge and discharge of the battery and an electric controller having a magnetic field, a current-energized member movable with respect to said field, and tending to move when both the field and moving member are energized, means exerting a mechanical force opposing said motion and so related to the electromagnetic force as to make the difference between the two said forces constant with a given degree of energization at any position in the range of travel of the movable member.

18. The combination of a source of supply, a work-circuit a storage battery for compensating for changes on the work-circuit and booster for controlling the charge and discharge of the battery and an electric controller having a magnetic field, a current-energized member movable with respect to said field, and tending to move when both the field and moving member are energized, means exerting a mechanical force opposing said motion and so related to the electromagnetic force as to make the difference between the two said forces constant with a given degree of energization at any position in the range of travel of the movable member, the control being effected directly by said movable member.

19. The combination of a source of supply, a work-circuit a storage battery for compensating for changes on the work-circuit and booster for controlling the charge and discharge of the battery and an electric controller having a magnetic field, a current-energized member movable with respect to said field, and tending to move when both the field and moving member are energized, means for exerting a mechanical force opposing said motion and so related to the electromagnetic force as to make the difference between the two said forces constant with a given degree of energization at any position in the range of travel of the movable member, the tendency to move and speed of motion being proportional to the change in degree of energization.

20. The combination of a source of supply, a work-circuit a storage battery for compensating for changes on the work-circuit and booster for controlling the charge and discharge of the battery and an electric controller having a magnetic field, a current-energized member movable with respect to said field, and tending to move when both the field and moving member are energized, means for exerting a mechanical force opposing said motion and so related to the electromagnetic force as to make the difference between the two said forces constant with a given degree of energization at any position in the range of travel of the movable member, the time required to move from one position to some other position being inversely proportional to the change in the electrical condition of the circuit, from which the controller is energized.

21. The combination of a source of supply, a work-circuit, a battery assisting the source of supply and a regulator controlling the charge and discharge of the battery, said regulator being adapted to move when the load on the source of supply begins to vary from the average and continues to move until the current is restored to average value by the action of the battery.

22. The combination of a source of supply, a booster connected in circuit, a work-circuit, a battery assisting the source of supply and a regulator controlling the charge and discharge of the battery, said regulator starting to move when the load on the work-circuit begins to vary from the average and continues to move until the energy given out by the battery or absorbed thereby compensates for the increase or decrease of energy demanded by the work-circuit.

23. The combination of a work-circuit, a main source of electrical supply adapted to feed the work-circuit, an auxiliary source of electrical supply assisting the main source of supply and an electroresponsive regulator controlling the energy delivered by said auxiliary source of supply, said regulator being adapted to move when the load on the main source of supply begins to vary from the average and continues to move until the current is restored to average value by the action of the auxiliary source.

24. The combination of a work-circuit, a main source of electrical supply adapted to feed the work-circuit, an auxiliary source of electrical supply assisting the main source of supply and an electroresponsive regulator controlling the energy delivered by said auxiliary source of supply, said regulator being adapted to move when the load on the main source of supply begins to vary from a predetermined amount and continues to move until the current is restored to said predetermined amount by the action of the auxiliary source.

In testimony whereof I have signed this specification in the presence of two subscribing witnesses.

JOSEPH BIJUR.

Witnesses:
  H. L. OBERTEUFFER,
  E. VAN ZANDT.